Sept. 2, 1969   A. W. WILSON   3,464,684
TORCH CUTTING MACHINE
Filed Oct. 21, 1965   3 Sheets-Sheet 1
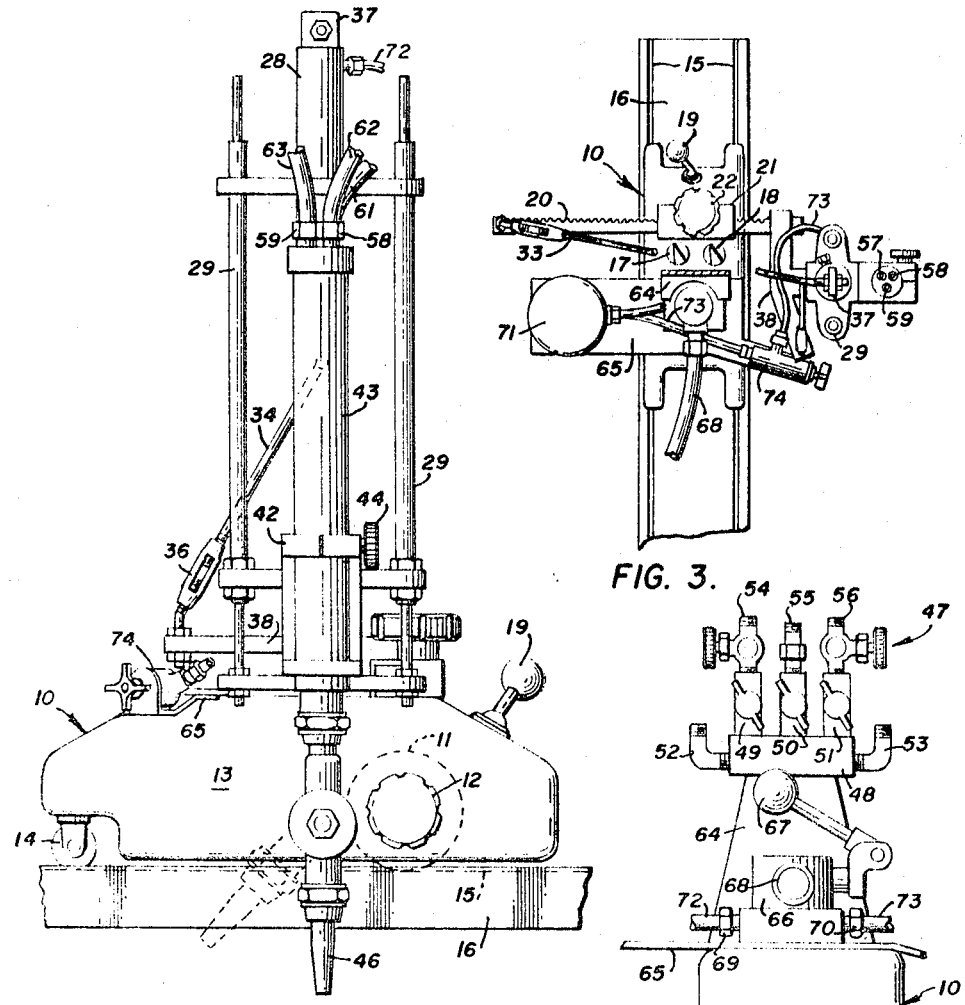
FIG. 1.
FIG. 3.
FIG. 6.
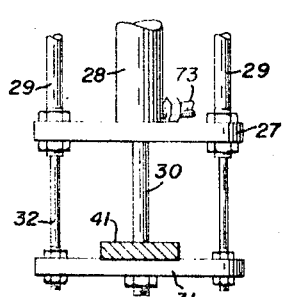
FIG. 4.
ALAN W. WILSON
INVENTOR.
BY *Herbert J. Brown*
ATTORNEY

ALAN W. WILSON
INVENTOR.

BY *Herbert J. Brown*

ATTORNEY

ALAN W. WILSON
INVENTOR.

BY Herbert J Brown

ATTORNEY

United States Patent Office 3,464,684
Patented Sept. 2, 1969

3,464,684
TORCH CUTTING MACHINE
Alan W. Wilson, 2808 Simondale,
Fort Worth, Tex. 76109
Filed Oct. 21, 1965, Ser. No. 499,256
Int. Cl. B23k 7/10; B23q 9/00
U.S. Cl. 266—23                   3 Claims

ABSTRACT OF THE DISCLOSURE

The combination with a conventional self-propelled cutting torch carriage and a portable track therefor, of a vertical fluid pressure cylinder on one side of and supported by the carriage, a piston rod extending beneath the cylinder and a swivel type cutting torch on the lower end of the rod whereby a single setting of the track on a workpiece provides for both vertical and horizontal cuts.

---

This invention relates to torch cutting machines for cutting structural steel and ferrous parts for heavy equipment. While the invention is capable of various uses it is particularly useful when preparing the ends of large I beams such as used in bridges. Obviously, such cuts must be accurate and should be smooth and beveled for subsequent welding. Frequently the ends of the beams have to be cut at angles and sometimes at compound angles. In assembly the ends of the connecting beams must be cut to match.

Heretofore, with ordinary cutting machines, it was necessary to align each beam several times for cutting one end of a beam; that is, for cutting one flange, the web and then the other flange. Such aligning was difficult and time consuming because of the weight and the size of the beams. By reason of the accuracy required, aligning was particularly difficult when angles and compound angles were involved.

An object of the invention is to provide a machine for torch cutting a length of ferrous material requiring only a single setting or orientation when aligning the material relative to the machine.

Another object is to provide a torch cutting machine capable of both vertical and horizontal cuts, and also capable of making bevel cuts for welding.

A particular object is to provide a cutting torch machine capable of cutting the ends of two lengths of material to be joined, as by welding, by a single setting of the base of the machine.

A further object is to provide means adjusting the line of vertical travel of the cutting torch.

These and other objects of the invention will become apparent from the following description and the accompanying drawings, in which:

FIGURE 1 is a side elevational view of a torch cutting machine according to the invention with valve block assembly removed.

FIGURE 3 is a reduced scale top plan view, also shown with the valve block assembly removed to better illustrate the carriage and other directly connected components.

FIGURE 4 is a broken elevational and sectional view of the lower end of the hydraulic-pneumatic cylinder assembly.

FIGURE 6 is a front elevational view of the valve block assembly mounted on the upper portion of the carriage.

Figure 2:
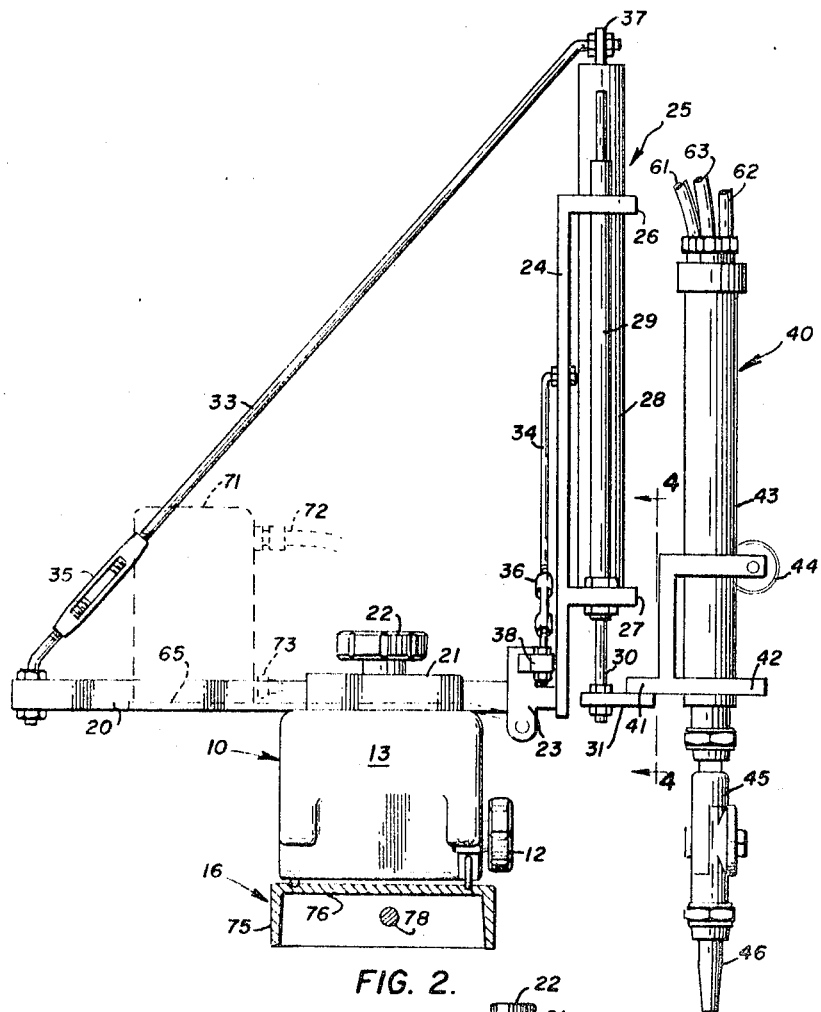
FIGURE 2 is a front elevational view of the machine illustrated in FIGURE 1.

The carriage 10, which is self-propelled, is well known in the art. Accordingly, the same is not herein described in detail, but an example of such carriage is manufactured by Indiana Oxygen Company, Indianapolis, Ind., under the trademark "Cut-A-Line." Generally, a carriage 10, such as referred to, is comprised of a base plate and electric motor thereon, neither of which is shown, drive wheels 11, a drive wheel locking knob 12 on a housing 13, and caster wheels 14 depending from the housing at the end thereof opposite the drive wheels. The wheels 11 and 14 operate in parallel grooves 15 in the surface of a portable track member 16, hereinafter referred to. Other details of the carriage 10 shown include forward and reverse speed controls 17 and 18 (FIGURE 3), a switch knob and handle 19, and a cross rack 20 mounted on top of the housing 13. The cross rack 20 is received in and extends from both sides of a block 21, and which block has a hand knob 22 for laterally adjusting the cross rack.

The present invention is directed, generally, to vertically movable cutting means mounted on a horizontally movable carriage, such as 10. On one end of the cross rack 20 there is a hinge 23 having a vertical support 24 thereon which supports a cylinder assembly 25. The cylinder assembly 25 includes upper and lower horizontal plates 26 and 27 mounted on the vertical support 24, and which plates receive and support a cylinder 28 through their centers and guide tubes 29 on either side. A piston rod 30 extends below the cylinder 28 and a crosshead 31 is mounted on the extending end of the piston rod. Guide rods 32 are connected with the crosshead 31 on either side of the piston rod 30 and are slidably received in the guide tubes 29. The cylinder 28 may be adjusted with reference to the vertical by means of angularly disposed aligning rods 33 and 34 each having a turnbuckle 35, 36 within its length. The first aligning rod 33 is connected between the end of the cross rack 20 opposite the hinge 23 and an ear 37 on top of the cylinder 28. The other aligning rod 34 is connected with the vertical support 24 intermediate its ends and the extending end of a lateral arm 38 mounted on the hinge 23.

A cutting torch assembly 40 is secured, as by welding, on the crosshead 31 by means of a projection 41 on the lower rear portion of a cradle type clamp 42. A torch barrel 43 is received in and extends through the clamp 42, and which barrel is vertically adjusted by a thumb screw 44. Below and communicating with the barrel 42, there is a swivel head 45 and cutting tip 46, all in the usual manner.

Fuel and oxygen are supplied to the barrel 43 of the torch assembly 40 through the valve block assembly 47 illustrated in FIGURE 6. This assembly, which is conventional, is comprised of a horizontal block 48, upstanding valves 49, 50 and 51 thereon, and a fuel inlet 52 in one end and an oxygen inlet 50 in the other. As shown, the valves 49, 50 and 51 are for fuel, cutting oxygen and preheat oxygen, respectively. Nipples 54, 55 and 56 atop the valves 49, 50 and 51 are connected with corresponding fittings 57, 58 and 59 in the top of the barrel 43 by means of flexible hoses 61, 62 and 63. The hoses 61, 62 and 63 are of sufficient length to permit full travel of piston rod 30. As best shown in FIGURES 3 and 6, the valve block 48 is supported on the carriage housing 13 by a vertical transverse plate 64.

On top of the carriage housing there is a laterally extending horizontal plate 65 on which there is mounted a two-way conventional air valve 66 having an operating lever 67, an inlet line 68 for connection with a source of air pressure, not shown, and first and second outlets 69 and 70. Also mounted on the plate 65 there is a closed oil reservoir 71, the upper end of which is connected with the first valve outlet 69 by an air line 72. The lower end of the reservoir 71 is connected with the lower end of the vertical cylinder 28 by an oil line 73. A needle valve assembly 74 is also mounted on the plate 65, FIGURE 1, and which needle valve assembly is connected with the oil line 73 for controlling the speed of the vertical movement of the cutting torch assembly 40.

The track member 16 shown is comprised of an inverted channel having depending side flanges 75 and a web 76. The grooves 15, previously referred to, are in the upper surface of the web 76 and parallel with the length thereof. On the bottom surface of the web 76, and along its longitudinal center line, there are first and second C-clamps 77 and 78. The first C-clamp 77 is detachably secured by a bolt, not numbered, in any one of a series of longitudinally spaced diodes 80 in the web 76. The second C-clamp 78 is slidably mounted on a rod 79 which is rigidly suspended by spaced cross members 81 between the channel flanges 75. The first cross member 81 is near the transverse center of the track 16, and the other member 81 is at the end of the track opposite the first referred to C-clamp 77.

In operation the torch assembly 40 is raised and lowered by operation of the lever 67 of the two-way air valve 66. When the lever 67 is in one position air under pressure is delivered from the first air valve outlet 69 to the top of the reservoir 71 through the air line 72. This forces the oil down and into the lower end of the cylinder 28 through the oil line 73. To move the torch assembly down, the lever 67 is moved to its other direction, causing air pressure to be transmitted to the top of the cylinder 28, causing the piston rod 30 to move downwardly. This is the usual direction when making a vertical cut. In either direction, the adjustment of the needle valve 74 controls the rate of movement of the torch assembly 40.

Figure 5:
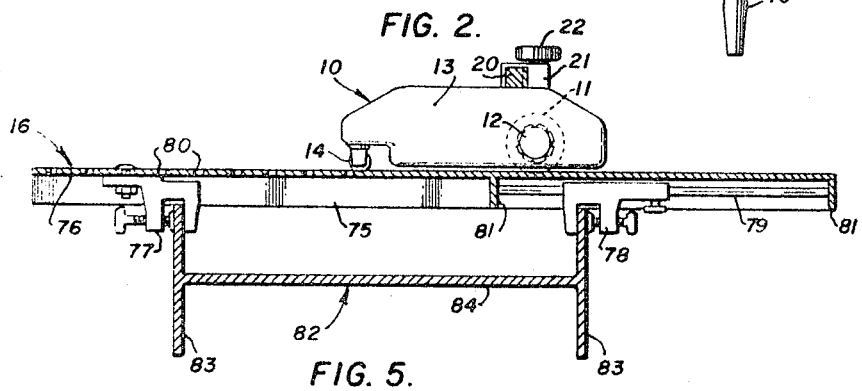
FIGURE 5 is an elevational and sectional view of the carriage and track applied to a workpiece.

To make a cut across an I beam 82, the latter is horizontally positioned, or at least partially horizontally positioned, on suitable supports with the flanges 83 of the beams vertically disposed. The track 16 is then placed across the top edges of the flanges 83 and clamped in place at the desired angle by means of the C-clamps 77 and 78, see FIGURES 5 and 8. The carriage 10 is then moved and stopped at a position outwardly of one beam flange 83 with the torch barrel 43 initially in a raised position. The cutting tip 43 is directed toward the flange 83 and is then caused to move downwardly by the described means, thus making a vertical cut. The barrel 43 and tip 46 are then adjusted so that the tip is pointed down at the upper side of the web 84, and the carriage is caused to move across the width of the web to make a transverse cut. The next step is to adjust the barrel 43 and tip 46 as before relative to the remaining vertical flange to make the last cut.

Figure 8:
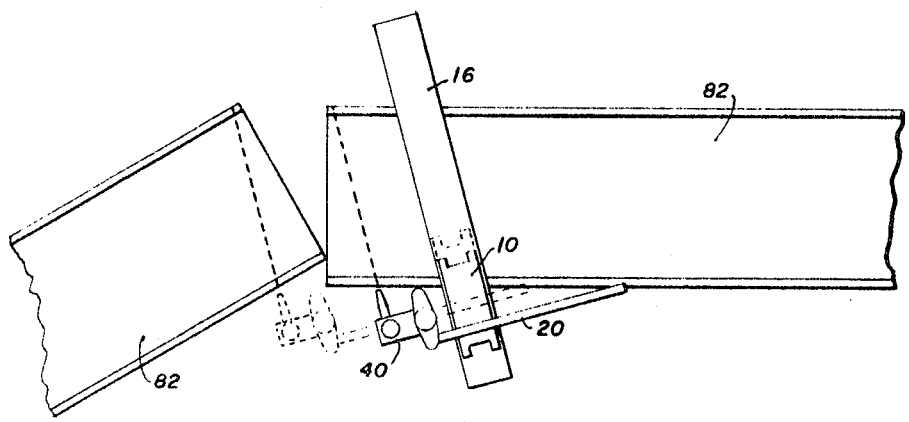
FIGURE 8 is a top plan schematic view showing how the ends of two beams to be matched are cut by a single setting of the track.
Figure 7:
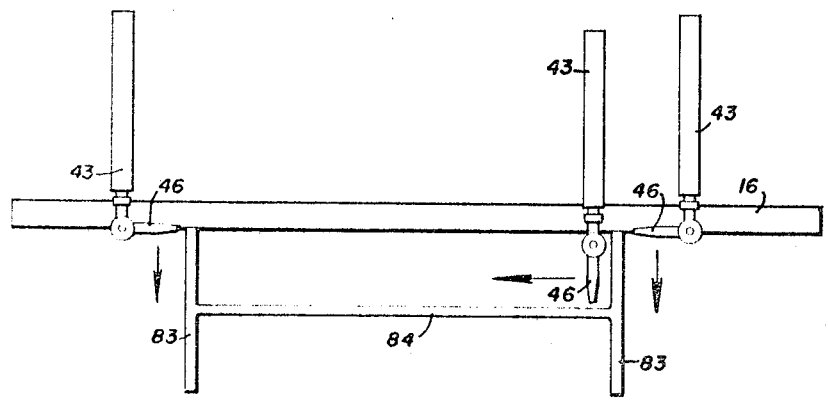
FIGURE 7 is an elevational schematic view showing the torch of the invention in three different positions for cutting the flanges and the web of an I beam by means of a single setting of the track thereon.
Figure 9:
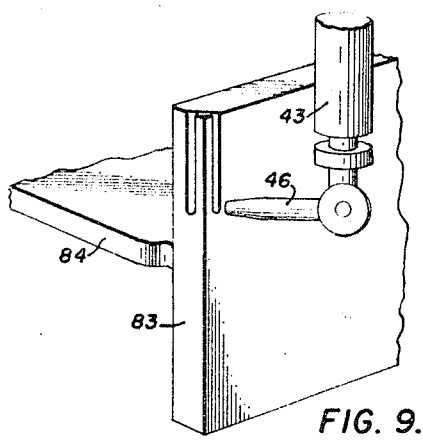
FIGURE 9 is a broken perspective view showing a position of the cutting tip for beveling a vertical flange of a beam.

As shown in FIGURE 8, the lengths of two beams 82 may be set up at the angle they are to be joined with their ends close together. The track 16 is then mounted on one of the beams 82 and the end is cut off in the described manner. The carriage 10 is then returned to its first position and, without moving the track 16, the cross rack 20 is moved to a position where the same operation may be performed on the second beam. Matching compound angles of small magnitude may be made as described in connection with FIGURE 8, but the adjacent ends of the beams 82 are raised or lowered accordingly and the same operations are repeated.

The invention is not limited to the exemplary construction herein shown and described, but may be made in various ways within the scope of the appended claims.

What is claimed is:

1. In combination with a self-propelled carriage and portable track therefor, a vertical fluid pressure cylinder supported by said carriage and positioned on one side thereof, said cylinder including a vertical piston rod extending from the bottom thereof, a cutting torch mounted on the lower end of the piston rod, said torch including an adjustable swivel cutting tip, means supplying fuel and oxygen to said torch and means selectively applying fluid pressure to either end of said cylinder whereby said torch is raised and lowered in a vertical line.

2. The combination defined in claim 1, and wherein carriage includes a laterally extensible cross rack thereon and wherein said cylinder is mounted on an end of said cross rack.

3. The combination defined in claim 1, and wherein said carriage includes a laterally extensible cross rack thereon, a hinge on one end of said cross rack on which said cylinder is vertically mounted, and means vertically adjusting said cylinder.

References Cited

UNITED STATES PATENTS

| | | |
|---|---|---|
| 2,389,585 | 11/1945 | Anderson. |
| 2,394,775 | 2/1946 | Hilstrom et al. |
| 2,500,245 | 3/1950 | Doyle. |
| 2,513,425 | 7/1950 | Lobosco. |
| 3,172,938 | 3/1965 | Schwartz. |
| 3,224,310 | 12/1965 | Bieri _____ 83—639 X |

J. SPENCER OVERHOLSER, Primary Examiner

R. D. BALDWIN, Assistant Examiner